N. D. BEECROFT.
Hoes.
No. 136,020.        Patented Feb. 18, 1873.
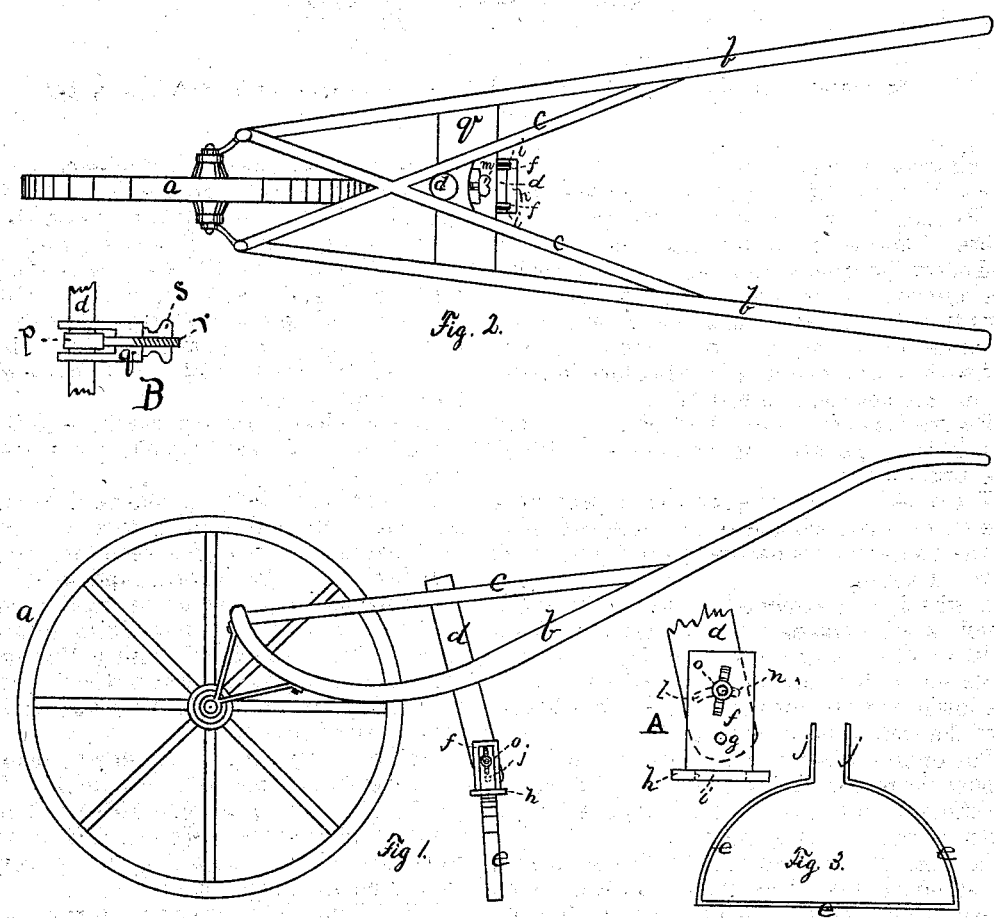
Witness
Inventor
Norval D. Beecroft
Per Atty Wm Franklin Searcy

UNITED STATES PATENT OFFICE

NORVAL D. BEECROFT, OF BANGOR, MAINE.

IMPROVEMENT IN HOES.

Specification forming part of Letters Patent No. 136,020, dated February 18, 1873.

*To all whom it may concern:*

Be it known that I, NORVAL D. BEECROFT, of Bangor, in the county of Penobscot and State of Maine, have invented a certain new and useful Improved Hoe; and I hereby declare the following to be a full, clear, and exact description of the same, which will enable others to make and use my invention, reference being had to the accompanying drawing forming part of this specification, in which—

Figure 1 shows a side view; Fig. 2, a plan; Fig. 3, front elevation of the hoe; A, detail of hoe attachment.

The object of my invention is to provide a hoe which shall economize the time and labor of the operator; its nature is fully illustrated in the drawing.

A wheel, $a$, is attached to two handles, $b\ b$, which may be braced by cross-braces or otherwise, as at $c\ c$. At the rear of the wheel and attached to the handles is a standard, $d$, to the lower end of which is secured a hoe-blade, $e$, of the shape shown in Fig. 3.

The operator takes hold of the handles and pushes the implement before him. Hoe-blades of different width may be used, adapted to the width of the row to be hoed.

In order to suit operators of different heights the standard $d$ is made adjustable, and can be raised or lowered at pleasure, varying the elevation of the handles, and may be secured by a set-screw, as at $m$.

The hoe-blade is also adjustable with regard to the angle it makes with the ground, for convenience in different kinds of hoeing. This is effected by means of plates $f\ f$ on each side of the standard $d$ at its lower end, secured thereto by a pivot, $g$, and attached to each other at the bottom by a plate, $h$, the sides of which project and have slots $i\ i$. A curved slot, $l$, struck from the pivot $g$ as a center, is made through the standard $d$. The ends $j\ j$ of the hoe are passed through the slots $i\ i$. A bolt, $n$, threaded at one end, is then passed through holes in these ends $j\ j$, through holes in the plates $f\ f$, and through the curved slot in the standard $d$, and a nut, $o$, turned on. The hoe-blade and plates $f\ f$ can then be made to assume any angle with the ground within the scope of the curved slot $l$, and all secured by tightening the nut $o$.

I do not claim, broadly, the shape of the hoe-blade, nor do I claim attaching a wheel to a hoe.

In order to adjust the hoe-blade so that it will cut at an angle or slashwise, for trimming near borders, or when the weeds are thick, the standard $d$ may be made round so as to turn in its sockets. It may be secured in position by means of a ring, $p$, surrounding it, and provided with a screw, $r$, passing through the cross-bar $q$, having upon it a thumb-nut, $s$, by tightening which it may be clamped by the ring. (See detail B.)

I do not claim any of the devices shown in the patents granted to N. H. Lindley, February 9, 1869, and January 18, 1870, for improvement in horse-hoes. My hoe differs both in construction and operation, and is designed for a different purpose; but What I do claim as my invention, and desire to secure by Letters Patent, is—

The combination of the wheel $a$, handles $b\ b$, and hoe-blade $e$, secured, substantially as described—to wit, by plates $f\ f$ and $h$, pivot $g$, and bolt $n$—to a vertically-adjustable standard, $d$, all operating substantially as set forth, for the purposes specified.

N. D. BEECROFT.

Witnesses:
WM. FRANKLIN SEAVEY,
J. Y. RICKER.